T. NIELSEN.
BEET HARVESTING MACHINE.
APPLICATION FILED SEPT. 6, 1917.
1,272,986.
Patented July 16, 1918.
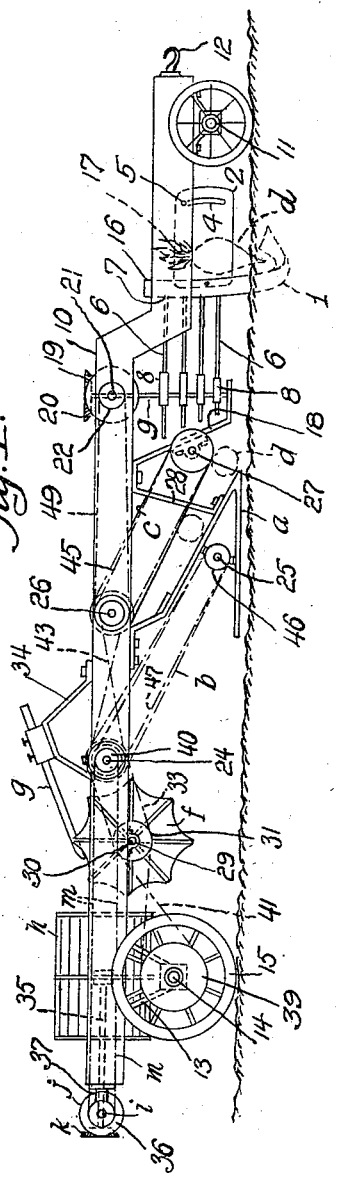
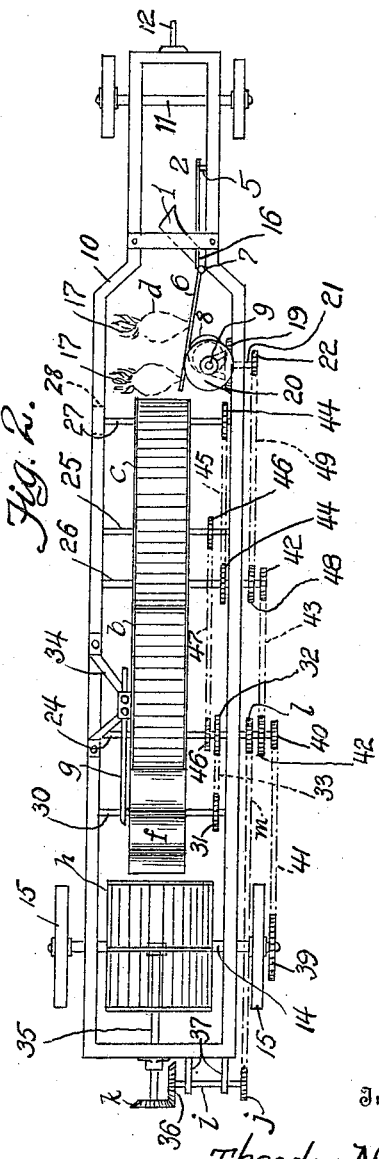
Witness
Chas. W. Stauffiger
Karl N. Butler
Inventor
Theodor Nielsen
By
Attorneys

UNITED STATES PATENT OFFICE.

THEODOR NIELSEN, OF LUNDELJERGGAARD, SÖNDER-BJERRE, DENMARK.

BEET-HARVESTING MACHINE.

1,272,986.  Specification of Letters Patent.  Patented July 16, 1918.

Application filed September 6, 1917. Serial No. 189,969.

*To all whom it may concern:*

Be it known that I, THEODOR NIELSEN, farmer, subject of the Kingdom of Denmark, residing at Lundeljerggaard, Sönder-Bjerre, Denmark, have invented certain new and useful Improvements in Beet-Harvesting Machines, of which the following is a specification.

This invention relates to a beet harvesting machine, and my invention aims to provide a novel machine by which beets and other vegetables may be removed from the ground, the crests or tops of the vegetables removed, and earth and foreign matter shaken or removed from the vegetables, such operations being successively carried on as the machine is moved over the ground.

My invention is further characterized by a beet harvesting machine wherein positive and reliable means are employed, in a manner as hereinafter set forth, for correctly positioning beets, after their removal from the ground so that the crests or tops thereof may be severed prior to entering a tumbling barrel or rotary member adapted to shake or agitate the beet to that extent that earth and other matter clinging to the beets will be removed.

My invention is further characterized by a machine wherein the parts are constructed with a view of reducing the cost of manufacture and retaining those features by which durability, simplicity of construction, and ease of operation are secured. With these ends in view, my invention resides in the novel construction, combination and arrangement of parts to be hereinafter described and then claimed.

Reference will now be had to the drawing, wherein—

Figure 1 is a side elevation of the beet harvesting machine, and

Fig. 2 is a plan of the same.

In the drawing, the reference numeral 10 denotes an oblong frame having the forward end thereof contracted and in a lower plane than the remaining portion of the frame. The forward end of the frame 10 is supported by a truck 11 and has provision, as at 12, whereby a tractor or a team of horses may be connected to the machine for pulling the same over the ground.

The rear end of the frame 10 has depending bearings 13 for a rear revoluble axle 14, said axle having the ends thereof provided with wheels 15 coöperating with the front truck 11 in supporting the main frame of the machine.

At the forward end of the frame 10 is a rigid depending support 16 for a share 1 adapted to unearth or raise beets —*d*— or other vegetables from the soil, the share being suitably shaped for such purpose without cutting or injuring the beet. Pivotally connected to the support 16 which is at one side of the frame with the share 1 in the longitudinal axis thereof is a vertically disposed plate 2 having a slot 4 into which protrudes a stud 5 carried by the frame 10, said stud limiting the tilting action of the plate 2 relative to the frame.

The plate 2 is adapted to gather or press to one side the crests or tops 17 of the beet —*d*—, besides tending to shift the beet to one side.

Fixed to the support 16, as at 7, are a plurality of rearwardly extending arms 6, preferably made of resilient metal, so that said arms will rebound or tend to assume their normal position. The arms 6 are disposed in a vertical plane and normally engage a plurality of eccentrics 8 on a vertically disposed shaft 9 suitably supported from the frame 10, said eccentrics varying in size with the largest eccentric contiguous to the frame 10 and the other eccentrics being gradually stepped in size to the lower end of the shaft 9. This arrangement causes the uppermost resilient arm 6 to be flexed or sprung to a greater degree than the lower-most arm, consequently a beet impinged against by said arms is caused to fall to the ground with the axis of the beet at right angles to the direction of travel of the machine. The beets are therefore caused to fall to one side, in a row, as indicated by dotted lines in Fig. 2, the crests or tops 17 all being in one direction, and the beets in position that they may be successively scooped or gathered up, as will presently appear.

The lower end of the vertical shaft 9 is supported by one end of a bracket 18 depending from the side of the frame 10, and the upper end of the shaft 9 has a beveled gear wheel 19 meshing with a similar wheel 20 mounted on a shaft 21, journaled in the side of the frame 10. The outer end of the shaft 21 has a sprocket wheel 22 and movement is imparted thereto in a manner as hereinafter set forth.

The bracket 18 coöperates with another bracket 28 of the frame 10 in supporting a scoop or inclined member —a— which is in the path of the beets —d— and is adapted to remove the beets from the ground. The scoop —a— incloses and forms the forward end of an endless conveyer —b— that is operated through the medium of shafts 24 and 25, the former being supported by the frame 10 and the latter in the scoop —a—. The conveyer —b— is a continuation of the scoop, and to cause the beets —d— to travel up the scoop —a— another conveyer —c— is arranged parallel to the scoop —a—, said conveyer —c— having shafts 26 and 27 supporting the same. The shaft 26 is revoluble in the frame 10 and the shaft 27 is revolubly held by the bracket 18 and the bracket 28 provided for such purpose at the opposite side of the frame 10 from the bracket 18.

The frame 10, adjacent the upper or rear end of the conveyer —b— has bearings 29 for a rotary drum or carrier —f—, which has the periphery thereof provided with longitudinal flutes or pockets adapted to receive beets from the conveyer —b—. The rotary drum or carrier —f— is on a shaft 30 journaled in the bearings 29, and said shaft has a sprocket wheel 31 alining with a sprocket wheel 32 on the shaft 24 and trained over the sprocket wheels 31 and 32 is a sprocket chain 33 so that a rotary movement may be imparted to the drum or carrier —f— from the upper conveyer shaft 24.

One side of the frame 10 is provided with a bracket 34 supporting an adjustable knife —g— which extends to one end of the drum or carrier —f— and is adapted to sever and remove crests or tops from beets in the pockets of the drum or carrier.

Journaled in the rear end of the frame 10 is a longitudinal shaft 35, and on the rear end of the shaft is a beveled gear wheel —k—. On the forward end of the shaft is a tumbling barrel —h— having open ends, said barrel having foraminous walls or walls composed of slats so that dirt and foreign matter may fall out of the barrel. The forward open end of the barrel is adapted to receive the beets from the drum or carrier —f—.

Meshing with the beveled gear wheel —k— is a beveled gear wheel 36 mounted on the end of a transverse shaft —i—, journaled in bearings 37, carried by the rear end of the frame 10. On the end of the shaft —i— is a sprocket wheel —j—, and this wheel alines with a similar wheel —l— on the protruding end of the shaft 24. Over the sprocket wheels —j— and —l— is trained an endless sprocket chain —m—, so that the shafts 35 and —i— may have movement imparted thereto from the shaft 24 to revolve the tumbling barrel —h—.

On the end of the axle 14 is a large sprocket wheel 39 alining with a small sprocket wheel 40 on the protruding end of the shaft 24. Over the sprocket wheels 39 and 40 is trained a twisted sprocket chain 41 adapted for imparting movement to the shaft 24 as the machine is moved over the ground.

On the shafts 24 and 26 are sprocket wheels 42 for a twisted sprocket chain 43 and on the shafts 26 and 27 are sprocket wheels 44 for a straight drive chain 45. Other sprocket wheels 46 are placed on the shafts 24 and 25 for a straight drive sprocket chain 47, while another sprocket wheel 48 is placed on the shaft 26 to aline with the sprocket wheel 22 and permit of a straight drive sprocket chain 49 imparting movement to the vertical shaft 9.

From the foregoing it will be observed that the resilient arm 6, conveyers —b— and —c—, rotary carrier —f—, and tumbling barrel —h— are all actuated from the rear revoluble axle of the machine, when said machine is pulled over the soil. The beets or other vegetables unearthed or uprooted by the share 1 will be successively carried to the rear end of the machine and eventually discharged with the crests or tops and earth or foreign matter removed from the beets or vegetables, thus materially facilitating the harvesting of beets.

While I have herein referred to sprocket wheels, sprocket chains, and beveled gear wheels as power transmission devices, it is to be understood, that pulleys, belts or their mechanical equivalents may be resorted to; furthermore, that the structural elements of the machine are susceptible to such variations and modifications as fall within the scope of the appended claims.

What I claim is:—

1. A beet harvesting machine comprising a frame, a truck supporting the forward end of said frame, a revoluble axle at the rear end of said frame, wheels on the end of said axle, an unearthing share at the forward end of said frame, means adjacent said share adapted for laying meets to one side, a scoop supported by said frame and adapted to scoop up said beets, conveyers adjacent said scoop and between which said beets are adapted to move, a rotary carrier adapted to receive beets from said conveyers, means on said frame at one end of said rotary carrier and adapted to remove crests from the beets, a tumbling barrel at the rear end of said frame adapted to receive beets from said rotary carrier, and means operated by said revoluble axle adapted to impart movement to said conveyers, said rotary carrier, said tumbling barrel and the first mentioned means.

2. A beet harvesting machine comprising a frame, a revoluble axle at the rear end thereof, wheels on the ends of said axle, an unearthing share at the forward end of said frame, a scoop supported below said frame adapted to scoop up beets unearthed by said share, conveyers adjacent said scoop and between which beets are adapted to move, a rotary carrier supported by said frame and adapted to receive beets from said conveyers, means on said frame at one end of said rotary carrier and adapted for removing crests from the beets, a tumbling barrel supported by said frame adapted to receive beets from said rotary carrier, and means operated by said revoluble axle adapted for imparting movement to said conveyer, said rotary carrier and said tumbling barrel.

3. A beet harvesting machine comprising a frame adapted to be moved over the ground, an unearthing share at the forward end of said frame adapted to uproot beets, resilient arms supported from said share and adapted to be actuated to lay beets to one side with the longitudinal axis thereof at right angles to the direction of movement of said frame, a scoop supported below said frame adapted to scoop up the beets, endless conveyers associated with said scoop and between which the beets are adapted to move, means on said frame adapted for removing crests from the beets, and means operated from the rear end of said frame adapted for imparting movement to said conveyers and actuating said resilient arms.

4. A beet harvesting machine comprising a frame adapted to move above the ground, an unearthing share at the forward end of said frame, resilient arms supported from said unearthing share and adapted to be flexed to cause the beets to lie in a row, a scoop supported by said frame adapted to scoop up the beets, endless conveyers associated with said scoop between which said beets are adapted to move, means on said frame adapted for removing crests from the beets, a tumbling barrel supported by said frame and adapted to receive the beets, and means operated from the rear end of said frame and adapted for imparting movement to said tumbling barrel, said endless conveyers and said arms.

In testimony whereof he affixes his signature in presence of two witnesses.

THEODOR NIELSEN.

Witnesses:
 T. ELURLE,
 VIGG. JURSEN.

Copies of this patent may be obtained for five cents each, by addressing the "Commissioner of Patents, Washington, D. C."